United States Patent [19]

Trainham, III et al.

[11] Patent Number: 5,411,641

[45] Date of Patent: May 2, 1995

[54] ELECTROCHEMICAL CONVERSION OF ANHYDROUS HYDROGEN HALIDE TO HALOGEN GAS USING A CATION-TRANSPORTING MEMBRANE

[75] Inventors: James A. Trainham, III, Newark, Del.; Clarence G. Law, Jr., West Trenton, N.J.; John S. Newman, Kensington, Calif.; Kenneth B. Keating, Wilmington, Del.; Douglas J. Eames, Berkeley, Calif.

[73] Assignee: E. I. Du Pont de Nemours and Company, Wilmington, Del.

[21] Appl. No.: 156,196

[22] Filed: Nov. 22, 1993

[51] Int. Cl.⁶ .................... C25B 1/24; C25B 9/00
[52] U.S. Cl. ...................... 204/59 R; 204/237; 204/252; 204/265; 204/266; 423/481; 423/483; 423/486; 423/487
[58] Field of Search ............... 204/59 R, 128, 60, 252, 204/266, 265, 237; 423/481, 483, 486, 487

[56] References Cited

U.S. PATENT DOCUMENTS

| | | | |
|---|---|---|---|
| 4,139,447 | 2/1979 | Faron et al. | 204/60 |
| 4,169,025 | 9/1990 | Needes | 204/98 |
| 4,191,618 | 3/1980 | Coker et al. | 204/98 |
| 4,210,501 | 7/1980 | Dempsey et al. | 204/128 |
| 4,224,121 | 9/1980 | Dempsey et al. | 204/98 |
| 4,294,671 | 10/1981 | Balko | 204/128 |
| 4,311,568 | 1/1982 | Balko | 204/128 |
| 4,595,579 | 6/1986 | Prudhon et al. | 423/487 |
| 4,959,132 | 9/1990 | Fedkiw, Jr. | 204/101 |
| 5,223,102 | 6/1993 | Fedkiw, Jr. et al. | 204/78 |

FOREIGN PATENT DOCUMENTS

| | | |
|---|---|---|
| 1179631 | 12/1984 | Canada . |
| 1195949 | 10/1985 | Canada . |
| 2312297 | 9/1974 | Germany ................ 204/59 R |
| 0363424 | 12/1931 | United Kingdom ....... 423/483 |
| 0861978 | 3/1961 | United Kingdom ....... 204/128 |

OTHER PUBLICATIONS

Appleby, A. J. et al., *Fuel Cell Handbook*, Van Nostrand Reinhold, New York, Chapter 10, pp. 284–312 no date available.

Jewulski, J. R., et al. *Solid–State Proton Conductors–Final Report*, For U.S. DOE, Office of Fossil Energy, Morgantown Energy Tech. Center, Morgantown, W. Va., Institute of Gas Technology, Chicago, Ill., Dec. 1990 no month available.

Minz, F. R., "HCl-Electrolysis-Technology for Recycling Chlorine," Bayer AG, Conference on Electrochemical Processing, Innovation & Progress, Glasgow, Scotland, UK, Apr. 21–23, 1993.

Takenaka H., et al., "Solid Polymer Electrolyte Water Electrolysis", *Int. J. Hydrogen Energy*, 7(5), pp. 397–403, 1982 no month available.

Wilson, M. S., et al., "High Performance Catalyzed Membranes of Ultra-low Pt Loadings for Polymer Electrolyte Fuel Cells", *J. Electrochem. Soc.*, 139(2), Feb. 1992.

*Primary Examiner*—Kathryn Gorgos
*Attorney, Agent, or Firm*—Jane E. Obee

[57] ABSTRACT

The invention relates to a process for electrochemically converting anhydrous hydrogen halide, such as hydrogen chloride, hydrogen fluoride, hydrogen bromide and hydrogen iodide, to essentially dry halogen gas, such as chlorine, fluorine, bromine and iodine gas, respectively. In a preferred embodiment, the present invention relates to a process for electrochemically converting anhydrous hydrogen chloride to essentially dry chlorine gas. This process allows the production of high-purity chlorine gas. In this process, molecules of essentially anhydrous hydrogen chloride are transported through an inlet of an electrochemical cell. The molecules of the essentially anhydrous hydrogen chloride are oxidized at the anode of the cell to produce essentially dry chlorine gas and protons, which are transported through the membrane of the cell. The transported protons are reduced at the cathode to form either hydrogen gas or water.

27 Claims, 2 Drawing Sheets

ELECTROCHEMICAL CONVERSION OF ANHYDROUS HYDROGEN HALIDE TO HALOGEN GAS USING A CATION-TRANSPORTING MEMBRANE

BACKGROUND OF THE INVENTION

1. Field of the Invention

The present invention relates to a process for electrochemically converting anhydrous hydrogen halide to an essentially dry halogen gas using a cation-transporting membrane. In particular, this process may be used to produce halogen gas such as chlorine, bromine, fluorine and iodine from a respective anhydrous hydrogen halide, such as hydrogen chloride, hydrogen bromide, hydrogen fluoride and hydrogen iodide.

2. Description of the Related Art

Hydrogen chloride (HCl) or hydrochloric acid is a reaction by-product of many manufacturing processes which use chlorine. For example, chlorine is used to manufacture polyvinylchloride, isocyanates, and chlorinated hydrocarbons/fluorinated hydrocarbons, with hydrogen chloride as a by-product of these processes. Because supply so exceeds demand, hydrogen chloride or the acid produced often cannot be sold or used, even after careful purification. Shipment over long distances is not economically feasible. Discharge of the acid or chloride ions into waste water streams is environmentally unsound. Recovery and feedback of the chlorine to the manufacturing process is the most desirable route for handling the HCl by-product. A number of commercial processes have been developed to convert HCl into usable chlorine gas. See e.g., F. R. Minz, "HCl-Electrolysis—Technology for Recycling Chlorine", Bayer AG, Conference on Electrochemical Processing, Innovation & Progress, Glasgow, Scotland, UK, Apr. 21–Apr. 23, 1993.

Currently, thermal catalytic oxidation processes exist for converting anhydrous HCl and aqueous HCl into chlorine. Commercial processes, known as the "Shell-Chlor", the "Kel-Chlor" and the "MT-Chlor" processes, are based on the Deacon reaction. The original Deacon reaction as developed in the 1870's made use of a fluidized bed containing a copper chloride salt which acted as the catalyst. The Deacon reaction is generally expressed as follows:

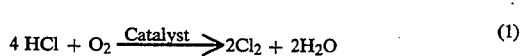

$$4\ HCl + O_2 \xrightarrow{\text{Catalyst}} 2Cl_2 + 2H_2O \quad (1)$$

where the following catalysts may be used, depending on the reaction or process in which equation (1) is used.

| Catalyst | Reaction or Process |
| --- | --- |
| Cu | Deacon |
| Cu, Rare Earth, Alkali | Shell-Chlor |
| $NO_2$, $NOHSO_4$ | Kel-Chlor |
| $Cr_mO_n$ | MT-Chlor |

The commercial improvements to the Deacon reaction have used other catalysts in addition to or in place of the copper used in the Deacon reaction, such as rare earth compounds, various forms of nitrogen oxide, and chromium oxide, in order to improve the rate of conversion, to reduce the energy input and to reduce the corrosive effects on the processing equipment produced by harsh chemical reaction conditions. However, in general these thermal catalytic oxidation processes are complicated because they require separating the different reaction components in order to achieve product purity. They also involve the production of highly corrosive intermediates, which necessitates expensive construction materials for the reaction systems. Moreover, these thermal catalytic oxidation processes are operated at elevated temperatures of 250° C. and above.

Electrochemical processes exist for converting aqueous HCl to chlorine gas by passage of direct electrical current through the solution. The current electrochemical commercial process is known as the Uhde process. In the Uhde process, aqueous HCl solution of approximately 22% is fed at 65° to 80° C. to both compartments of an electrochemical cell, where exposure to a direct current in the cell results in an electrochemical reaction and a decrease in HCl concentration to 17% with the production of chlorine gas and hydrogen gas. A polymeric separator divides the two compartments. The process requires recycling of dilute (17%) HCl solution produced during the electrolysis step and regenerating an HCl solution of 22% for feed to the electrochemical cell. The overall reaction of the Uhde process is expressed by the equation:

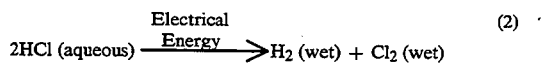

$$2HCl\ (\text{aqueous}) \xrightarrow{\text{Electrical Energy}} H_2\ (\text{wet}) + Cl_2\ (\text{wet}) \quad (2)$$

As is apparent from equation (2), the chlorine gas produced by the Uhde process is wet, usually containing about 1% to 2% water. This wet chlorine gas must then be further processed to produce a dry, usable gas. If the concentration of HCl in the water becomes too low, it is possible for oxygen to be generated from the water present in the Uhde process. This possible side reaction of the Uhde process due to the presence of water, is expressed by the equation:

$$2H_2O \rightarrow O_2 + 4H^+ + 4e^- \quad (3)$$

Further, the presence of water in the Uhde system limits the current densities at which the cells can perform to less than 500 amps/ft.$^2$, because of this side reaction The result is reduced electrical efficiency and corrosion of the cell components due to the oxygen generated.

Another electrochemical process for processing aqueous HCl has been described in U.S. Pat. No. 4,311,568 to Balko. Balko employs an electrolytic cell having a solid polymer electrolyte membrane. Hydrogen chloride, in the form of hydrogen ions and chloride ions in aqueous solution, is introduced into an electrolytic cell. The solid polymer electrolyte membrane is bonded to the anode to permit transport from the anode surface into the membrane. In Balko, controlling and minimizing the oxygen evolution side reaction is an important consideration. Evolution of oxygen decreases cell efficiency and leads to rapid corrosion of components of the cell. The design and configuration of the anode pore size and electrode thickness employed by Balko maximizes transport of the chloride ions. This results in effective chlorine evolution while minimizing the evolution of oxygen, since oxygen evolution tends to increase under conditions of chloride ion depletion near the anode surface. In Balko, although oxygen evolution may be minimized, it is not eliminated. As can be seen from FIGS. 3 to 5 of Balko, as the overall current density is increased, the rate of oxygen evolution increases, as evidenced by the increase in the concentration of oxygen found in the chlorine produced. Balko can run at higher current densities, but is limited by the deleterious effects of oxygen evolution. If the Balko cell were to be run at high current densities, the anode would be destroyed.

In general, the rate of an electrochemical process is characterized by its current density. In many instances, a number of electrochemical reactions may occur simultaneously. When this is true, the electrical driving force for electrochemical reactions is such that it results in an appreciable current density for more than one electrochemical reaction. For these situations, the reported or measured current density is a result of the current from more than one electrochemical reaction. This is the case for the electrochemical oxidation of aqueous hydrogen chloride. The oxidation of the chloride ions is the primary reaction. However, the water present in the aqueous hydrogen chloride is oxidized to evolve oxygen as expressed in equation (3). This is not a desirable reaction. The current efficiency allows one to describe quantitatively the relative contribution of the current from multiple sources. For example, if at the anode or cathode multiple reactions occur, then the current efficiency can be expressed as:

$$\eta_j = \frac{i_j}{\sum_{j=1}^{NR} i_j} \quad (4)$$

where $\eta_j$ is the current efficiency of reaction $j$, and where there are NR number of reactions occurring.

For the example of an aqueous solution of HCl and an anode, the general expression above is:

$$\eta_{Cl_2} = \frac{i_{Cl_2}}{i_{Cl_2} + i_{O_2}} \quad (5)$$

$$\eta_{Cl_2} + \eta_{O_2} = 1.0 \quad (6)$$

In the specific case of hydrogen chloride in an aqueous solution, oxidation of chloride is the primary reaction, and oxygen evolution is the secondary reaction. In this case, the current density is the sum of the two anodic reactions. Since $\eta_{O_2}$ is not zero, the current efficiency for chloride oxidation is less than unity, as expressed in equations (7) and (8) below. Whenever one is concerned with the oxidation of chloride from an aqueous solution, then the current efficiency for oxygen evolution is not zero and has a deleterious effect upon the yield and production of chlorine.

$$\eta_{O_2} \neq 0 \quad (7)$$

$$\eta_{Cl_2} = 1.0 - \eta_{O_2} \ldots i_{Cl_2} = \eta_{Cl_2} \times i_{reported} \quad (8)$$

Furthermore, electrolytic processing of aqueous HCl can be mass-transfer limited. Mass-transfer of species is very much influenced by the concentration of the species as well as the rate of diffusion. The diffusion coefficient and the concentration of species to be transported are important factors which affect the rate of mass transport. In an aqueous solution, such as that used in Balko, the diffusion coefficient of a species is $\sim 10^{-5}$ cm.$^2$/sec. In a gas, the diffusion coefficient is dramatically higher, with values $\sim 10^{-2}$ cm.$^2$/sec. In normal industrial practice for electrolyzing aqueous hydrogen chloride, the practical concentration of hydrogen chloride or chloride ion is $\sim 17\%$ to $22\%$, whereas the concentration of hydrogen chloride is $100\%$ in a gas of anhydrous hydrogen chloride. Above $22\%$, conductance drops, and the power penalty begins to climb. Below $17\%$, oxygen can be evolved from water, per the side reaction of equation (3), corroding the cell components, reducing the electrical efficiency, and contaminating the chlorine.

SUMMARY OF THE INVENTION

The present invention solves the problems of the prior art by providing a process for the direct production of essentially dry halogen gas from anhydrous hydrogen halide. This process allows for direct processing of anhydrous hydrogen halide produced from many manufacturing processes, without first dissolving the hydrogen halide in water. This direct production of essentially dry halogen gas, when done, for example, for chlorine gas, is less capital intensive than processes of the prior art, which require separation of water from the chlorine gas.

The present invention also solves the problems of the prior art by providing a process in which chlorine is produced from a medium that is essentially water-free. Hence, in the electrochemical conversion of hydrogen chloride (gas) to chlorine and hydrogen, no appreciable amount of oxygen is produced. Oxidation of water at the anode is an undesirable side reaction which is virtually eliminated in the present invention. Hence, the reaction can be run at higher current densities for conversion to chlorine, which translates into higher chlorine production per unit area of electrode. Thus, the present invention requires lower investment costs than the electrochemical conversions of hydrogen chloride of the prior art.

An advantage of using anhydrous hydrogen chloride in the present invention rather than aqueous hydrogen chloride is that the theoretical cell voltage is lower by at least 0.3 V. This allows the cell to be operated at lower overall cell voltages than cells operated with aqueous hydrogen chloride. This advantage can translate directly into lower power costs per pound of chlorine generated than in the aqueous electrochemical processes of the prior art.

The present invention also provides a process which produces drier chlorine gas with fewer processing steps as compared to that produced by electrochemical or catalytic systems of the prior art, thereby simplifying processing conditions and reducing capital costs.

The present invention also provides for a process for converting anhydrous hydrogen chloride to essentially dry chlorine gas in order to recycle chlorine gas back to a manufacturing, or synthesis process, thereby eliminating environmental problems associated with the discharge of chloride ions.

To achieve the foregoing solutions, and in accordance with the purposes of the invention as embodied and broadly described herein, there is provided a process for the direct production of essentially dry halogen gas from essentially anhydrous hydrogen halide, wherein molecules of essentially anhydrous hydrogen halide are transported through an inlet of an electrochemical cell comprising a cation-transporting membrane and an anode and a cathode each disposed in contact with a respective side of the membrane; the molecules of the essentially anhydrous hydrogen halide are oxidized at the anode to produce essentially dry halogen gas and protons; the protons are transported through the membrane of the electrochemical cell; and the transported protons are reduced at the cathode.

In a preferred embodiment of the present invention, there is provided a process for the direct production of essentially dry chlorine gas from essentially anhydrous hydrogen chloride, wherein molecules of anhydrous hydrogen chloride are transported through an inlet of an electrochemical cell comprising a cation-transporting membrane and an anode and a cathode each disposed in contact with a respective side of the membrane; the molecules of the essentially anhydrous hydrogen chloride are oxidized at the anode to produce essentially dry chlorine gas and protons; the protons are transported through the membrane of the electrochemical cell; and the transported protons are reduced at the cathode. An oxygen-containing gas may be introduced at the cathode side of the membrane, and when this is done, the protons and oxygen are reduced at the cathode side to form water.

It is likely that a portion of the anhydrous hydrogen chloride is unreacted after contacting the cell. In the present invention, the portion of the unreacted hydrogen chloride is separated from the essentially dry chlorine gas and is recycled back to the electrochemical cell. In addition, the essentially dry chlorine gas may be fed to a synthesis process which produces anhydrous hydrogen chloride as a by-product.

BRIEF DESCRIPTION OF THE DRAWINGS

FIG. is a schematic diagram of an electrochemical cell for producing halogen gas from anhydrous hydrogen halide according to a first embodiment of the present invention, which has a hydrogen-producing cathode.

DESCRIPTION OF THE PREFERRED EMBODIMENTS

Reference will now be made in detail to the present preferred embodiments of the invention as illustrated in the accompanying drawings.

In accordance with the first embodiment of the present invention, there is provided an electrochemical cell for the direct production of essentially dry halogen gas from anhydrous hydrogen halide. This cell will be described with respect to a preferred embodiment of the present invention, which directly produces essentially dry chlorine gas from anhydrous hydrogen chloride. However, this cell may alternatively be used to produce other halogen gases, such as bromine, fluorine and iodine from a respective anhydrous hydrogen halide, such as hydrogen bromide, hydrogen fluoride and hydrogen iodide. The term "direct" means that the electrochemical cell obviates the need to remove water from the chlorine produced or the need to convert essentially anhydrous hydrogen chloride to aqueous hydrogen chloride before electrochemical treatment. Such a cell is shown generally at 10 in FIG. 1. In this first embodiment, chlorine gas, as well as hydrogen, is produced by this cell.

Figure 1:
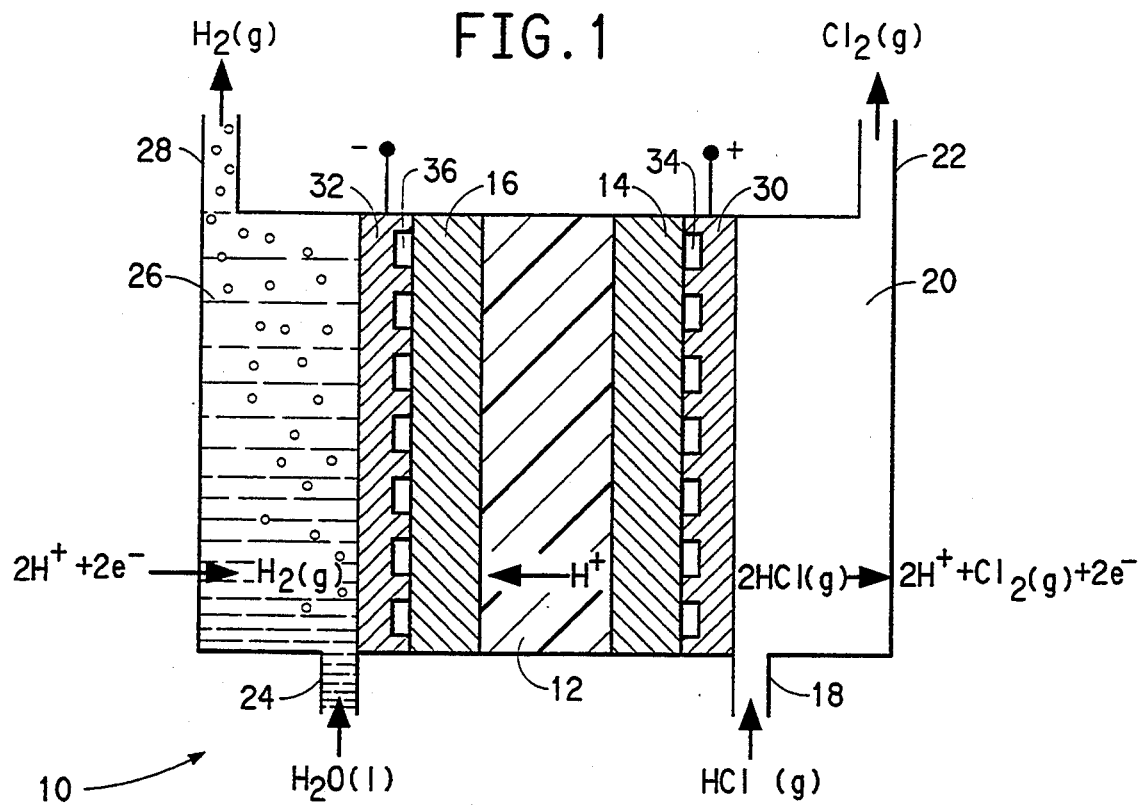

Cell 10 comprises a cation-transporting membrane 12 as shown in FIG. 1. More specifically, membrane 12 may be a proton-conducting membrane. Membrane 12 can be a commercial cationic membrane made of a fluoro or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type —$CF_2CFRSO_3H$ and —$OCF_2CF_2CF_2SO_3H$, where R is a F, Cl, $CF_2Cl$, or a $C_1$ to $C_{10}$ perfluoroalkyl radical. The membrane resin may be, for example, a copolymer of tetrafluoroethylene with $CF_2$=$CFOCF_2CF(CF_3)OCF_2CF_2SO_3H$. Sometimes those resins may be in the form that has pendant —$SO_2F$ groups, rather than —$SO_3H$ groups. The sulfonyl fluoride groups can be hydrolyzed with potassium hydroxide to —$SO_3K$ groups, which then are exchanged with an acid to —$SO_3H$ groups. Suitable cationic membranes, which are made of hydrated, copolymers of polytetrafluoroethylene and poly-sulfonyl fluoride vinyl ether-containing pendant sulfonic acid groups, are offered by E. I. du Pont de Nemours and Company of Wilmington, Del. under the trademark "NAFION" (hereinafter referred to as NAFION®). In particular, NAFION® membranes containing pendant sulfonic acid groups include NAFION® 117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g. NAFION® 324 has a two-layer structure, a 125 μm-thick membrane having an equivalent weight of 1100 g., and a 25 μm-thick membrane having an equivalent weight of 1500 g. There also is offered a NAFION® 117F grade, which is a precursor membrane having pendant $SO_2F$ groups that can be converted to sulfonic acid groups.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x \cdot Al_2O_3$, in which x ranges from 5 ($\beta''$-alumina) to 11 ($\beta$-alumina). This material and a number of solid electrolytes which are useful for the invention are described in the *Fuel Cell Handbook*, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-a}$)

and barium neodymiate cerate ($BaCe_{0.9}Nd_{0.01}O_{3-\alpha}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

Electrochemical cell 10 also comprises a pair of electrodes, specifically, an anode 14 and a cathode 16, each disposed in contact with a respective side of the membrane as shown in FIG. 1. Anode 14 has an anode inlet 18 which leads to an anode chamber 20, which in turn leads to an anode outlet 22. Cathode 16 has a cathode inlet 24 which leads to a cathode chamber 26, which in turn leads to a cathode outlet 28. As known to one skilled in the art, if electrodes are placed on opposite faces of a membrane, cationic charges (protons in the HCl reaction being described) are transported through the membrane from anode to cathode, while each electrode carries out a half-cell reaction. In the present invention, molecules of anhydrous hydrogen chloride are transported to the surface of the anode through inlet 18. The molecules of the anhydrous hydrogen chloride are oxidized to produce essentially dry chlorine gas and protons. The essentially dry chlorine gas exits through anode outlet 22 as shown in FIG. 1. The protons, designated as H+ in FIG. 1, are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. The phrase "mixtures comprising any of these elements, oxides and alloys" means at least one of these elements, oxides and alloys mixed with at least one of any other of these elements, oxides and alloys and/or any other constituent. However, in general, the oxides of these materials are not used for the cathode. Other catalyst materials suitable for use with the present invention may include, but are not limited to, transition metal macrocycles in monomeric and polymeric forms and transition metal oxides, including perovskites and pyrochores.

In a hot-pressed electrode, the electrochemically active material may comprise a catalyst material on a support material. The support material may comprise particles of carbon and particles of polytetrafluoroethylene, which is sold under the trademark "TEFLON" (hereinafter referred to as TEFLON®), commercially available from E. I. du Pont de Nemours and Company of Wilmington, Del. The electrochemically active material may be bonded by virtue of the TEFLON® to a support structure of carbon paper or graphite cloth and hot-pressed to the cation-transporting membrane. The hydrophobic nature of TEFLON® does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg./cm.$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells" Los Alamos National Laboratory, J. Electrochem. Soc., Vol. 139, No. 2 L28–30, 1992, where the inks contain solubilized NAFION® ionomer to enhance the catalyst-ionomer surface contact and to act as a binder to the NAFION® membrane sheet. With such a system, loadings as low as 0.017 mg. active material per cm.$^2$ have been achieved.

A current collector 30, 32, respectively, is disposed in electrical contact with the anode and the cathode, respectively, for collecting charge. Another function of the current collectors is to direct anhydrous hydrogen chloride to the anode and to direct any water added to the cathode at inlet 24 to keep the membrane hydrated, as will be discussed below. More specifically, the current collectors are machined with flow channels 34, 36 as shown in FIG. 1 for directing the anhydrous HCl to the anode and the water added to the cathode. It is within the scope of the present invention that the current collectors and the flow channels may have a variety of configurations. Also, the current collectors may be made in any manner known to one skilled in the art. For example, the current collectors may be machined from graphite blocks impregnated with epoxy to keep the hydrogen chloride and chlorine from diffusing through the block. This impregnation also prevents oxygen and water from leaking through the blocks. The current collectors may also be made of a porous carbon in the form of a foam, cloth or matte. The current collectors may also include thermocouples or thermistors (not shown) to monitor and control the temperature of the cell.

The electrochemical cell of the first embodiment also comprises a structural support for holding the cell together. Preferably, the support comprises a pair of backing plates which are torqued to high pressures to reduce the contact resistances between the current collectors and the electrodes. The plates may be aluminum, but are preferably a corrosion-resistant metal alloy. The plates include heating elements (not shown) which are used to control the temperature of the cell. A non-conducting element, such as TEFLON® or other insulator, is disposed between the collectors and the backing plates.

The electrochemical cell of the first embodiment also includes a voltage source (not shown) for supplying a voltage to the cell. The voltage source is attached to the cell through current collectors 30 and 32 as indicated by the + and − terminals, respectively, as shown in FIG. 1.

When more than one anode-cathode pair is used, such as in manufacturing, a bipolar arrangement is preferred. In the simple cell shown in FIG. 1, a single anode and cathode are shown. The current flows from the external voltage source to the cathode and returns to the external source through the lead connected to the anode. With the stacking of numerous anode-cathode pairs, it is not most convenient to supply the current in this fashion. Hence, for a bipolar arrangement, the current flows through the cell stack. This is accomplished by having the current collector for the anode and the cathode machined from one piece of material. Thus, on one face of the current collector, the gas (HCl) for the anode flows in machined channels past the anode. On the other face of the same current collector, channels are machined, and the current is used in the cathodic reaction, which produces hydrogen in this invention. The current flows through the repeating units of a cell stack without the necessity of removing and supplying current to each individual cell. The material selected for the current collector must be resistant to the oxidizing conditions on the anode side and the reducing conditions on the cathode side. Of course, the material must be electronically conductive. In a bipolar configuration, insulators are not interspersed in the stack as described above. Rather, there are backing plates at the ends of the stack, and these may be insulated from the adjacent current collectors.

Further in accordance with the first embodiment of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. It should be noted that the production of bromine gas and iodine gas can be accomplished when the electrochemical cell is run at elevated temperatures (i.e., about 60° C. and above for bromine and about 190° C. and above for iodine). In the case of iodine, a membrane made of a material other than NAFION ® should be used.

The operation of the electrochemical cell of the first embodiment will now be described as it relates to a preferred embodiment of the process of the present invention, where the anhydrous hydrogen halide is hydrogen chloride. In operation, molecules of essentially anhydrous hydrogen chloride gas are transported to the surface of the anode through anode inlet 18 and through gas channels 34. Water (H$_2$O (1) as shown in FIG. 1) is delivered to the cathode through cathode inlet 24 and through channels 36 formed in cathode current collector 32 to hydrate the membrane and thereby increase the efficiency of proton transport through the membrane. Molecules of the anhydrous hydrogen chloride (HCl(g) as shown in FIG. 1) are oxidized at the anode under the potential created by the voltage source to produce essentially dry chlorine gas (Cl$_2$(g)) at the anode, and protons (H+) as shown in FIG. 1. This reaction is given by the equation:

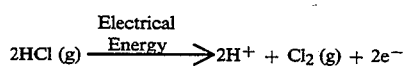

(9)

The chlorine gas (Cl$_2$(g)) exits through anode outlet 22 as shown in FIG. 1. The protons (H+) are transported through the membrane, which acts as an electrolyte. The transported protons are reduced at the cathode. This reaction is given by the equation:

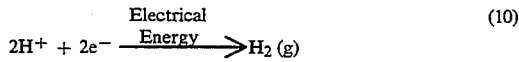

(10)

The hydrogen which is evolved at the interface between the electrode and the membrane exits via cathode outlet 28 as shown in FIG. 1. The hydrogen bubbles through the water and is not affected by the TEFLON ® in the electrode.

Figure 2:
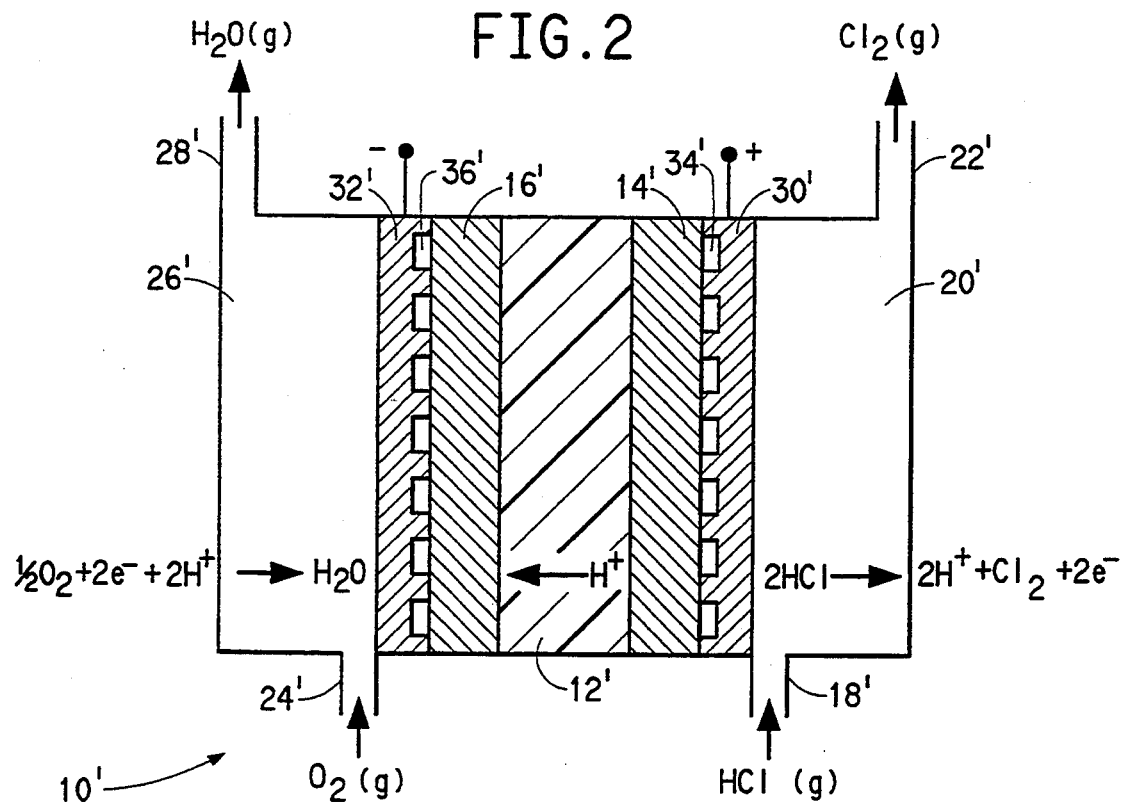
FIG. 2 is a schematic view of an electrochemical cell for producing halogen gas from anhydrous hydrogen halide according to a second embodiment of the present invention, which has a water-producing cathode.

FIG. 2 illustrates a second embodiment of the present invention. Wherever possible, elements corresponding to the elements of the embodiment of FIG. 1 will be shown with the same reference numeral as in FIG. 1, but will be designated with a prime (').

In accordance with the second embodiment of the present invention, there is provided an electrochemical cell for the direct production of essentially dry halogen gas from anhydrous hydrogen halide. This cell will be described with respect to a preferred embodiment of the present invention, which directly produces essentially dry chlorine gas from anhydrous hydrogen chloride. However, this cell may alternatively be used to produce other halogen gases, such as bromine, fluorine and iodine from a respective anhydrous hydrogen halide, such as hydrogen bromide, hydrogen fluoride and hydrogen iodide. Such a cell is shown generally at 10' in FIG. 2. In this second embodiment, water, as well as chlorine gas, is produced by this cell.

Cell 10' comprises a cation-transporting membrane 12' as shown in FIG. 2. Membrane 12' may be a proton-conducting membrane. Preferably, membrane 12' comprises a solid polymer membrane, and more preferably the polymer comprises NAFION ® as described above with respect to the first embodiment.

Electrochemical cell 10' also comprises a pair of electrodes, specifically, an anode 14' and a cathode 16', each disposed in contact with a respective side of the membrane as shown in FIG. 2. Anode 14' and cathode 16' function as described above with respect to the first embodiment. Anode 14' has an inlet 18' which leads to an anode chamber 20', which in turn leads to an outlet 22'. Cathode 16' has an inlet 24' which leads to a cathode chamber 26', which in turn leads to an outlet 28'.

As in the first embodiment, the anode and the cathode may comprise porous electrodes, and more specifically, gas-diffusion electrodes which may be constructed and comprise materials as described above in the first embodiment.

The electrochemical cell of the second embodiment of the present invention also comprises a current collector 30', 32' disposed in electrical contact with the anode and the cathode, respectively, for collecting charge. The current collectors are machined with flow channels 34', 36' as shown in FIG. 2 for directing the anhydrous HCl to the anode and the oxygen (O$_2$) to the cathode. The current collectors are constructed and function as described above with respect to the first embodiment. In addition to collecting charge, another function of the current collectors in this second embodiment is to direct anhydrous hydrogen chloride across the anode. The cathode current collector directs the oxygen-containing gas, which may contain water vapor as the result of humidification, to the cathode. Water vapor may be needed to keep the membrane hydrated. However, water vapor may not be necessary in this embodiment because of the water produced by the electrochemical reaction of the oxygen (O$_2$) added as discussed below.

The electrochemical cell of the second embodiment also comprises a structural support for holding the cell together. Preferably, the support comprises a pair of backing plates (not shown) which are constructed and which function as described above with respect to the first embodiment.

The electrochemical cell of the second embodiment also includes a voltage source (not shown) for supplying a voltage to the cell. The voltage source is attached to the cell through current collectors 30' and 32' as indicated by the + and − terminals, respectively, as shown in FIG. 2.

Further in accordance with the second embodiment of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. It should be noted that the production of bromine gas and iodine gas can be accomplished when the electrochemical cell is run at elevated temperatures (i.e., about 60° C. and above for bromine and about 190° C. and above for iodine). In the case of iodine, a membrane made of a material other than NAFION® should be used.

The operation of the electrochemical cell of the second embodiment will now be described as it relates to a preferred embodiment of the process of the present invention, where the anhydrous hydrogen halide is hydrogen chloride. In operation, molecules of essentially anhydrous hydrogen chloride are transported to the anode through anode inlet 18' and through gas channels 34'. An oxygen-containing gas, such as oxygen ($O_2(g)$ as shown in FIG. 2), air or oxygen-enriched air (i.e., greater than 21 mol % oxygen in nitrogen) is introduced through cathode inlet 24' as shown in FIG. 2 and through channels 36' formed in the cathode current collector. Although air is cheaper to use, cell performance is enhanced when enriched air or oxygen is used. This cathode feed gas may be humidified to aid in the control of moisture in the membrane. Molecules of the hydrogen chloride ($HCl(g)$) as shown in FIG. 2) are oxidized under the potential created by the voltage source to produce essentially dry chlorine gas at the anode, and protons (H+) as shown in FIG. 2, as expressed in equation (9) above. The chlorine gas ($Cl_2$) exits through anode outlet 22' as shown in FIG. 2. The protons (H+) are transported through the membrane, which acts as an electrolyte. Oxygen and the transported protons are reduced at the cathode to water, which is expressed by the equation:

$$\tfrac{1}{2}O_2(g) + 2e^- + 2H^+ \rightarrow H_2O(g) \qquad (11)$$

The water formed ($H_2O$ (g) in equation (11)) exits via cathode outlet 28' as shown in FIG. 2, along with any nitrogen and unreacted oxygen. The water also helps to maintain hydration of the membrane, as will be further explained below.

In this second embodiment, the cathode reaction is the formation of water. This cathode reaction has the advantage of more favorable thermodynamics relative to $H_2$ production at the cathode as in the first embodiment. This is because the overall reaction in this embodiment, which is expressed by the following equation:

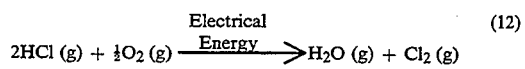

$$2HCl(g) + \tfrac{1}{2}O_2(g) \xrightarrow{\text{Electrical Energy}} H_2O(g) + Cl_2(g) \qquad (12)$$

involves a smaller free-energy change than the free-energy change for the overall reaction in the first embodiment, which is expressed by the following equation:

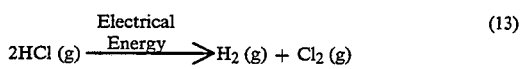

$$2HCl(g) \xrightarrow{\text{Electrical Energy}} H_2(g) + Cl_2(g) \qquad (13)$$

Thus, the amount of voltage or energy required as input to the cell is reduced in this second embodiment.

The membrane of both the first and the second embodiments must be hydrated in order to have efficient proton transport. Thus, the process of either embodiment of the present invention includes the step of keeping the cathode side of the membrane moist to increase the efficiency of proton transport through the membrane. In the first embodiment, which has a hydrogen-producing cathode, the hydration of the membrane is obtained by keeping liquid water in contact with the cathode. The liquid water passes through the gas-diffusion electrode and contacts the membrane. In the second embodiment, which has a water-producing cathode, the membrane hydration is accomplished by the production of water as expressed by equation (11) above and by the water introduced in a humidified oxygen-feed or air-feed stream. This keeps the conductivity of the membrane high.

In either of the first or second embodiments, the electrochemical cell can be operated over a wide range of temperatures. Room temperature operation is an advantage, due to the ease of use of the cell. However, operation at elevated temperatures provides the advantages of improved kinetics and increased electrolyte conductivity. It should be noted also that one is not restricted to operate the electrochemical cell of either the first or the second embodiment at atmospheric pressure. The cell could be run at differential pressure gradients, which change the transport characteristics of water or other components in the cell, including the membrane.

The electrochemical cell of either embodiment of the present invention can be operated at higher temperatures at a given pressure than electrochemical cells operated with aqueous hydrogen chloride of the prior art. This affects the kinetics of the reactions and the conductivity of the NAFION®. Higher temperatures result in lower cell voltages. However, limits on temperature occur because of the properties of the materials used for elements of the cell. For example, the properties of a NAFION® membrane change when the cell is operated above 120° C. The properties of a polymer electrolyte membrane make it difficult to operate a cell at temperatures above 150° C. With a membrane made of other materials, such as a ceramic material like beta-alumina, it is possible to operate a cell at temperatures above 200° C.

Figure 3:
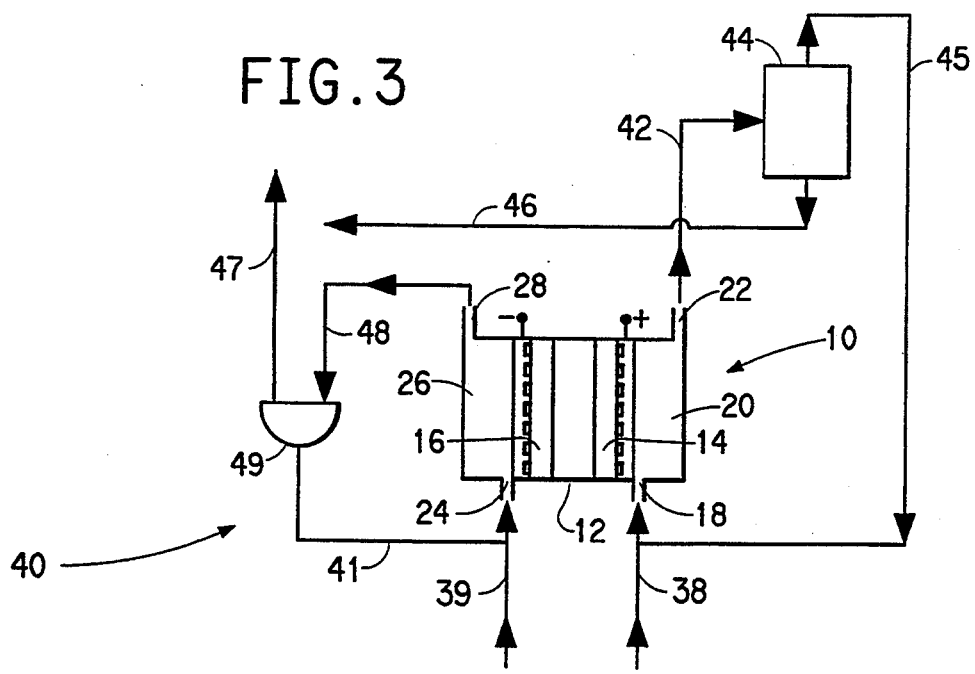
FIG. 3 is a schematic diagram of a system which separates a portion of unreacted hydrogen chloride from the essentially dry chlorine gas and recycles it back to the electrochemical cell of FIG. 1.

In either the first or the second embodiment of the present invention, a portion of the anhydrous hydrogen chloride may be unreacted after contacting the cell and may exit the cell through the anode outlet along with the chlorine gas. This concept is illustrated with respect to FIG. 3, where a system for recycling unreacted anhydrous hydrogen chloride from essentially dry chlorine gas is shown generally at 40. It should be noted that the system of FIG. 3 could be used to recycle other unreacted anhydrous hydrogen halides from a respective essentially dry halogen gas, such as fluorine, bromine or iodine, chlorine gas being used only as a representative halogen gas. The system of FIG. 3 recycles the unreacted anhydrous hydrogen chloride back to cell 10 of the first embodiment, which includes membrane 12, anode 14, anode chamber 20, cathode 16 and cathode chamber 26 as described above. Cell 10 also includes current collectors 30, 32 having flow channels 34, 36 formed therein. Cell 10 also includes a feed line 38 for feeding anhydrous hydrogen chloride and a feed line 39 for feeding water, as described above for the first embodiment. The unreacted portion of the anhydrous HCl is separated from the essentially dry chlorine gas by a separator 44 in a separation process which may involve distillation, adsorption, extraction, membrane separation or any number of known separation techniques. The separated, unreacted portion of anhydrous HCl in the essentially dry chlorine gas is recycled through a line 45 as shown in FIG. 3 back to anode inlet 18 of electrochemical cell 10 as shown in FIG. 3. The separated chlorine gas exits through a line 46. In the system of FIG. 3, hydrogen gas ($H_2$) exits cell 10 through cathode outlet 28 as described with respect to the first embodiment and through a line 48. Excess water may also exit through cathode outlet 28, where it is separated from hydrogen gas in a knock-out tank 49 and recycled to cathode inlet 24 through a line 41. The separated hydrogen gas exits through a line 47. It should be understood that the cell of the second embodiment of the present invention alternatively could be used in the system of FIG. 3, except that oxygen gas ($O_2$) would enter the cathode inlet from feed line 39, and water in the form of gas ($H_2O(g)$), along with any nitrogen and unreacted oxygen, would exit the cathode outlet.

Figure 4:
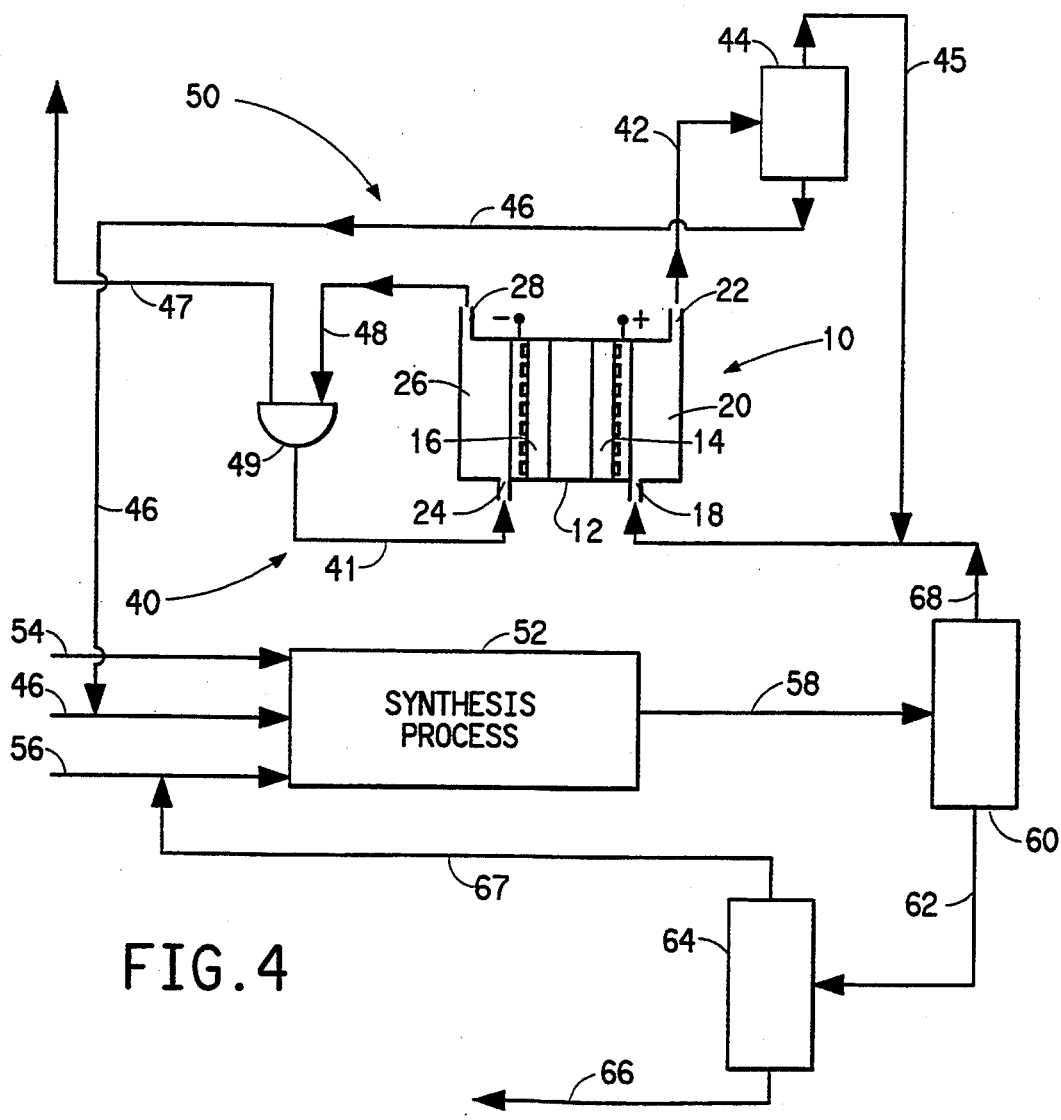
FIG. 4 is a schematic diagram of a modification to the system of FIG. 3 which includes a synthesis process which produces anhydrous hydrogen chloride as a by-product and where the essentially dry chlorine gas is recycled to the synthesis process, and the unreacted hydrogen chloride is recycled back to the electrochemical cell of FIG. 1.

A modification of the system as shown in FIG. 3 above involves recycling the essentially dry chlorine gas which has been separated from the unreacted anhydrous hydrogen chloride to a synthesis process where chlorine is a reactant and anhydrous hydrogen chloride is a by-product. This modification is illustrated in FIG. 4, where a system which recycles separated chlorine gas to a synthesis process is shown generally at 50. System 50 includes system 40 as described above, as well as a synthesis process 52 and other components associated therewith as described below. Essentially dry chlorine gas is recycled through a line 46 as described above to synthesis process 52. Other reactant inlet lines are shown at 54 and 56. For instance, in a hydrofluorination process, inlet line 54 could bring in hydrocarbon, and inlet line 56 could bring in hydrogen fluoride (HF). Fluorinated hydrocarbons, unreacted HF and anhydrous hydrogen chloride exit process 52 through a line 58 and are separated in a separator 60 by any known separation process. The anhydrous hydrogen chloride is fed to anode inlet 18 through a line 68 and is combined with a recycled stream in line 45 as shown in FIG. 4. Fluorinated hydrocarbons and unreacted HF exit separator 60 via a line 62 and flow to a further separator 64, which separates the fluorinated hydrocarbons from the unreacted HF. The fluorinated hydrocarbons exit separator 64 through a line 66. The unreacted HF is recycled back to synthesis process 52 through a line 67, which joins up with inlet line 56. This system could also be used for bringing in hydrochlorofluorocarbons or chlorofluorocarbons plus hydrogen and a hydrodechlorination catalyst to produce hydrogen chloride. It is, of course, within the scope of the present invention alternatively to use the cell of the second embodiment in the system of FIG. 4 with the differences to the system as noted above.

The invention will be clarified by the following Examples, which are intended to be purely exemplary of the invention. In the Examples given below, experimental data are presented which show some of the results that have been obtained by operating the first embodiment of the present invention for different electrode materials, temperatures, and different modes of operation. More specifically, in these experiments, the current and the cell potential were measured for three different temperatures and for two different electrode materials.

The electrode/membrane assemblies used in the following Examples are commercially available from Giner, Inc. of Waltham, Massachusetts, as membrane and electrode assemblies (MEAs) containing 0.35 mg. precious metal per $cm.^2$ and integrally bonded to NAFION® 117 membrane in the H+form. Electrodes as described in U.S. Pat. No. 4,210,501 may also be used with the present invention. It is also within the scope of the present invention to use other known metallization techniques in making electrodes for use with the present invention. For example, the technique used in U.S. Pat. No. 4,959,132 to Fedkiw, frequently referred to as Impregnation-Reduction, is an appropriate method to use with the present invention. Alternatively, the metallization technique may be used, as described in Japanese Publication No. 38934, published in 1980 and J. Hydrogen Energy, 5, 397 (1982).

EXAMPLE 1

In this Example, a non-steady state electrochemical experiment (i.e., of a duration of five minutes for each potential setting) generating chlorine and hydrogen was performed in an electrochemical cell which was 1 cm.×1 cm. in size. Platinum (Pt) extended with carbon was used for the cathode, and ruthenium oxide ($RuO_2$) extended with carbon was utilized in the anode. The anode and cathode each contained 0.35 mg./$cm.^2$ precious metal. The anode and the cathode were both bonded to the membrane, which was made of NAFION® 117. The potential from the power source was stepped in 0.10 volt increments from 1.0 to 2.0 volts. At each 0.10 volt increment, the potential was maintained for five minutes. The current response at the specific cell potentials was recorded at three different temperatures, namely 40° C., 60° C. and 80° C., in order to assess the importance of this variable upon cell performance and is given in Table 1 below.

TABLE 1

| Cell Potential [volts] | Current Value [mAmp./$cm.^2$] | | |
|---|---|---|---|
| | 40° C. | 60° C. | 80° C. |
| 1.1 | 24 | 35 | 10 |
| 1.2 | 112 | 140 | 55 |
| 1.3 | 250 | 265 | 135 |
| 1.4 | 380 | 410 | 240 |
| 1.5 | 540 | 540 | 340 |
| 1.6 | 585 | 620 | 440 |
| 1.7 | 640 | 710 | 540 |
| 1.8 | 660 | 760 | 630 |
| 1.9 | 700 | | 700 |

TABLE 1-continued

| Cell Potential | Current Value [mAmp./cm.$^2$] | | |
|---|---|---|---|
| [volts] | 40° C. | 60° C. | 80° C. |
| 2.0 | 770 | | 750 |

EXAMPLE 2

In this Example, a steady state electrochemical experiment (i.e., of a duration of 7 to 20 hours for each potential setting) generating chlorine and hydrogen was performed in an electrochemical cell which was 1 cm.×1 cm. in size. As in Example 1, platinum (Pt) extended with carbon was used for the cathode, and ruthenium oxide (RuO$_2$) extended with carbon was utilized in the anode. Also as in Example 1, the anode and cathode each contained 0.35 mg./cm.$^2$ precious metal, and the anode and the cathode were both bonded to the NAFION ® 117 membrane. The cell potential from the power source was held at specific values for a long time period, i.e., 7 to 20 hours. Again, the current response at the specific cell potentials was recorded at three different temperatures, namely 40° C., 60° C. and 80° C. and is given in Table 2 below.

TABLE 2

| Cell Potential | Current Value [mAmp./cm.$^2$] | | |
|---|---|---|---|
| [volts] | 40° C. | 60° C. | 80° C. |
| 1.4 | 200 | 210 | 210 |
| 1.5 | 310 | 250 | 250 |
| 1.6 | 380 | 380 | |
| 1.7 | 470 | 460 | |
| 1.8 | | 540 | |

EXAMPLE 3

In this Example, a non-steady state electrochemical experiment (i.e., of a duration of five minutes for each potential setting) generating chlorine and hydrogen was performed in an electrochemical cell which was 1 cm.×1 cm. in size, as in the above Examples. In this Example, platinum (Pt) extended with carbon was used for both the anode and the cathode. The anode and cathode each contained 0.35 mg./cm.$^2$ precious metal. The anode and the cathode were both bonded to the membrane, which was made of NAFION ® 117. The potential from the power source was stepped in 0.10 volt increments from 1.0 to 2.0 volts. At each 0.10 volt increment, the potential was maintained for five minutes. The current response at the specific cell potentials was recorded at two different temperatures, namely 40° 0C. and 60° C., and is given in Table 3 below.

TABLE 3

| Cell Potential | Current Value [mAmp./cm.$^2$] | |
|---|---|---|
| [volts] | 40° C. | 60° C. |
| 1.1 | 25 | 30 |
| 1.2 | 96 | 125 |
| 1.3 | 200 | 260 |
| 1.4 | 310 | 395 |
| 1.5 | 425 | 500 |
| 1.6 | 520 | 610 |
| 1.7 | 600 | 685 |
| 1.8 | 670 | 720 |
| 1.9 | 725 | 760 |
| 2.0 | 780 | 780 |

EXAMPLE 4

In this Example, a steady state electrochemical experiment (i.e., of a duration of 7 to 20 for each potential setting) generating chlorine and hydrogen was performed in an electrochemical cell which was 1 cm.×1 cm. in size, as in the above Examples. In this Example, platinum (Pt) extended with carbon was used for both the anode and the cathode. The anode and cathode each contained 0.35 mg./cm.$^2$ precious metal. The anode and the cathode were both bonded to the membrane, which was made of NAFION ® 117. In this Example, the cell potential from the power source was held at specific values for a long time period, i.e., 7 to 20. Again, the current response at the specific cell potentials was recorded at three different temperatures, namely 40° C., 60° C. and 80° C. and is given in Table 4 below.

TABLE 4

| Cell Potential | Current Value [mAmp./cm.$^2$] | | |
|---|---|---|---|
| [volts] | 40° C. | 60° C. | 80° C. |
| 1.3 | | 240 | |
| 1.4 | 300 | 350 | 330 |
| 1.5 | 400 | 450 | 380 |
| 1.6 | 495 | 520 | |
| 1.7 | 560 | | |

The results of these Examples indicate electrochemical cell performance which can exceed that generally obtained in the prior art.

Additional advantages and modifications will readily occur to those skilled in the art. The invention, in its broader aspects, is, therefore, not limited to the specific details, representative apparatus and illustrative Examples shown and described. Accordingly, departures may be made from such details without departing from the spirit or scope of the general inventive concept as defined by the appended claims and their equivalents.

What is claimed is:

1. A process for the direct production of essentially dry halogen gas from essentially anhydrous hydrogen halide, wherein:
    (a) molecules of essentially anhydrous hydrogen halide are fed to an inlet of an electrochemical cell and are transported to an anode of the cell;
    (b) the molecules of the essentially anhydrous hydrogen halide are oxidized at the anode to produce essentially dry halogen gas and protons;
    (c) the protons are transported through a cation-transporting membrane of the electrochemical cell; and
    (d) the transported protons are reduced at a cathode of the electrochemical cell.

2. The process of claim 1, wherein the hydrogen halide-producing halogen gas is selected from the group consisting of: hydrogen chloride, hydrogen bromide, hydrogen fluoride and hydrogen iodide.

3. A process for the direct production of essentially dry chlorine gas from essentially anhydrous hydrogen chloride, wherein:
    (a) molecules of essentially anhydrous hydrogen chloride are fed to an inlet of an electrochemical cell and are transported to an anode of the cell;
    (b) the molecules of the essentially anhydrous hydrogen chloride are oxidized at the anode to produce essentially dry chlorine gas and protons;
    (c) the protons are transported through a cation-transporting membrane of the electrochemical cell; and (d) the transported protons are reduced at a cathode of the electrochemical cell.

4. The process of claims 1 or 3, wherein the transported protons are reduced to form hydrogen gas.

5. The process of claim 1 or 3, wherein a gas containing oxygen is introduced at the cathode side of the membrane and the protons and oxygen are reduced at the cathode side to form water.

6. The process of claim 5, wherein the oxygen-containing gas comprises one of: air, oxygen, and oxygen-enriched air.

7. A process for recycling unreacted anhydrous hydrogen halide generated from the direct production of essentially dry halogen gas from essentially anhydrous hydrogen halide, wherein:
(a) molecules of essentially anhydrous hydrogen halide are fed to an inlet of an electrochemical cell and are transported to an anode of the cell;
(b) a portion of the essentially anhydrous hydrogen halide is oxidized at the anode to produce essentially dry halogen gas and protons;
(c) the protons are transported through a cation-transporting membrane of the electrochemical cell;
(d) the transported protons are reduced at a cathode of the electrochemical cell;
(e) another portion of the essentially anhydrous hydrogen halide is unreacted and is separated from the essentially dry halogen gas; and
(f) the unreacted, separated portion of the anhydrous hydrogen halide exits the cell through an outlet thereof and is recycled to the inlet of the electrochemical cell.

8. The process of claim 7, wherein the essentially dry halogen gas is recycled to a synthesis process which produces anhydrous hydrogen halide as a by-product.

9. A process for recycling essentially dry halogen gas to a synthesis process, where the essentially dry halogen gas is generated directly from essentially anhydrous hydrogen halide, wherein:
(a) molecules of essentially anhydrous hydrogen halide are fed to an inlet of an electrochemical cell and are transported to an anode of the cell;
(b) a portion of the essentially anhydrous hydrogen halide is oxidized at the anode to produce essentially dry halogen gas and protons;
(c) the protons are transported through a cation-transporting membrane of the electrochemical cell;
(d) the transported protons are reduced at a cathode of the electrochemical cell; and
(e) the essentially dry halogen gas is recycled to a synthesis process which produces anhydrous hydrogen halide as a by-product.

10. An electrochemical cell for the direct production of essentially dry halogen gas from essentially anhydrous hydrogen halide, comprising:
(a) means for oxidizing molecules of essentially anhydrous hydrogen halide to produce essentially dry halogen gas and protons;
(b) cation-transporting means for transporting the protons therethrough, wherein the oxidizing means is disposed in contact with one side of the cation-transporting means; and
(c) means for reducing the transported protons, wherein the reducing means is disposed in contact with the other side of the cation-transporting means.

11. The electrochemical cell of claim 10, wherein the oxidizing means is an anode and the reducing means is a cathode and the cation-transporting means is a cation-transporting membrane, and further wherein the anode and the cathode comprise gas-diffusion electrodes.

12. The electrochemical cell of claim 10, wherein the oxidizing means is an anode, the reducing means is a cathode, and the cation-transporting means is a cation-transporting membrane, and further wherein the anode and the cathode comprise an electrochemically active material disposed adjacent to a surface of the cation-transporting membrane.

13. The electrochemical cell of claim 12, wherein a thin film of the electrochemically active material is applied directly to the membrane on opposite surfaces thereof.

14. The electrical cell of claim 12, wherein the electrochemically active material is deposited into the membrane on opposite surfaces thereof.

15. The electrical cell of claim 12, wherein the electrochemically active material of the anode and the cathode comprises a catalyst material on a support material.

16. The electrical cell of claim 15, wherein the support material comprises carbon.

17. The electrochemical cell of claim 15, wherein the catalyst material comprises one of the following: platinum, ruthenium, osmium, rhenium, rhodium, iridium, palladium, gold, titanium and zirconium, and the oxides, alloys and mixtures thereof.

18. A process for the direct production of essentially dry halogen gas from essentially anhydrous hydrogen halide, wherein:
(a) molecules of essentially anhydrous hydrogen halide are fed to an inlet of an electrochemical cell and are transported to an anode of the cell;
(b) the molecules of the essentially anhydrous hydrogen halide are oxidized at the anode to produce essentially dry halogen gas and protons;
(c) the protons are transported through a cation-transporting membrane of the electrochemical cell to a cathode, the membrane having an anode side and a cathode side;
(d) a gas containing oxygen is introduced at the cathode side of the membrane; and
(e) the transported protons are reduced at the cathode, and the protons and oxygen are reduced at the cathode to form water.

19. The process of claims 1,3, or 18, further including the step of keeping the cathode side of the membrane moist to increase the efficiency of proton transport through the membrane.

20. The process of claims 1, 3 or 18 wherein the cathode and the anode comprise gas-diffusion electrodes.

21. The process of claim 1,3 or 19, wherein the anode and the cathode comprise an electrochemically active material disposed adjacent to the surface of the cation-transporting membrane.

22. The process of claim 21, wherein a thin film of the electrochemically active material is applied directly to the membrane.

23. The process of claim 21, wherein the electrochemically active material is deposited into the membrane.

24. The process of claim 21, wherein the electrochemically active material comprises a catalyst material on a support material.

25. The process of claim 24, wherein the support material comprises carbon.

26. The process of claim 15, wherein the catalyst material comprises one of the following: platinum, ruthenium, osmium, rhenium, rhodium, iridium, palladium, gold, titanium and zirconium, and the oxides, alloys and mixtures thereof.

27. The process of claim 18, wherein the oxygen-containing gas comprises one of the following: air, oxygen and oxygen-enriched air.

* * * * *